United States Patent
Chan et al.

(10) Patent No.: US 9,036,479 B2
(45) Date of Patent: May 19, 2015

(54) MECHANISM TO ENABLE BUFFER TO BUFFER CREDIT RECOVERY USING LINK RESET PROTOCOL

(71) Applicant: Brocade Communications Systems, Inc., San Jose, CA (US)

(72) Inventors: Hor-May Chan, Fremont, CA (US); Chao Zhang, Saratoga, CA (US); Pushpanathan Chidambaram, Santa Clara, CA (US); Srikanth Rayas, Bangalore (IN); Vijay Mohan Guvva, Marathahalli (IN); Ganesh Murugesan, Bangalore (IN); Venkatesh Puvvada, Hyderabad (IN)

(73) Assignee: Brocade Communications Systems, Inc., San Jose, CA (US)

( * ) Notice: Subject to any disclaimer, the term of this patent is extended or adjusted under 35 U.S.C. 154(b) by 35 days.

(21) Appl. No.: 13/790,593

(22) Filed: Mar. 8, 2013

(65) Prior Publication Data

US 2014/0254371 A1 Sep. 11, 2014

(51) Int. Cl.
*H04L 12/835* (2013.01)
*H04L 12/861* (2013.01)

(52) U.S. Cl.
CPC ............... *H04L 47/30* (2013.01); *H04L 49/90* (2013.01)

(58) Field of Classification Search
CPC ............................. H04L 47/30; H04L 49/90
USPC .......................... 370/235, 236, 412, 419, 463
See application file for complete search history.

(56) References Cited

U.S. PATENT DOCUMENTS

| | | | |
|---|---|---|---|
| 8,072,988 B2 | 12/2011 | Dropps et al. | |
| 2002/0159385 A1* | 10/2002 | Susnow et al. | 370/229 |
| 2005/0163168 A1* | 7/2005 | Sheth et al. | 370/537 |
| 2005/0216783 A1* | 9/2005 | Sundaram et al. | 714/4 |
| 2008/0159149 A1* | 7/2008 | Okuno | 370/237 |
| 2008/0279195 A1* | 11/2008 | Okuno | 370/395.6 |
| 2009/0086635 A1* | 4/2009 | DeCusatis et al. | 370/236 |
| 2010/0128607 A1* | 5/2010 | Dropps et al. | 370/235 |
| 2011/0075555 A1* | 3/2011 | Ziegler | 370/229 |

OTHER PUBLICATIONS

American National Standard of Accredited Standards Committee INCITS, Information Technology Industry Council, "Project T11/ 1861-D, Rev. 0.90—Fibre Channel Framing and Signaling—3 (FC-FS-3)", Aug. 6, 2009, 409 pages.
Brocade, "Buffer-to-Buffer Credits and Their Effect on FICON Performance", 2007, 8 pages.

* cited by examiner

*Primary Examiner* — Brian D Nguyen
(74) *Attorney, Agent, or Firm* — Wong, Cabello, Lutsch, Rutherford & Brucculeri, L.L.P.

(57) ABSTRACT

A buffer to buffer credit recovery mechanism is disclosed in which the ports involved in the credit recovery operation are synchronized while credit recovery is being enabled and during a credit recovery operation when credit recovery parameters are being reset. Buffer to buffer credit recovery involves exchanging primitive control signals and parameters during the login sequence to enable credit recovery. Once credit is lost; there may be a need for resetting a link to reset the credit recovery counters and BB credits. Both of these processes require synchronization between the ports involved in the credit recovery mechanism. This synchronization is achieved by enabling credit recovery during the Link Reset protocol negotiation and ensuring that no frames or R_RDYs are exchanged during the procedure.

22 Claims, 8 Drawing Sheets

MECHANISM TO ENABLE BUFFER TO BUFFER CREDIT RECOVERY USING LINK RESET PROTOCOL

TECHNICAL FIELD

The present invention relates to the field of computer networking, and in particular to improved techniques for buffer to buffer credit recovery in Fibre Channel networks.

BACKGROUND

Storage networks can comprise several Fibre Channel (FC) switches interconnected in a fabric topology. These switches are interconnected by a number of inter-switch links (ISLs), which carry both data and control information. An ISL is terminated at a port on each of the two switches it connects to. The ISL typically provides a physical link between the two switches. The basic information carrier in Fibre Channel is a frame. Thus when data is sent via a Fibre Channel network, the data is generally encapsulated within a frame. Frames can be transmitted between switch ports over the ISL.

To prevent a target device (either host or storage) from having to drop frames, the Fibre Channel architecture provides flow control mechanisms based on a system of credits. Each of these credits represents the ability of the device to accept additional frames. If a recipient issues no credits to the sender, no frames can be sent. Pacing the transport of subsequent frames on the basis of this credit system helps prevent the loss of frames and reduces the frequency of entire Fibre Channel sequences needing to be retransmitted across the link.

Upon arrival at a receiver, a frame goes through several steps. It is received, deserialized, decoded, and stored in a receive buffer where it is processed by the receiving port. If another frame arrives while the receiver is processing the first frame, a second receive buffer is needed to hold this new frame. Unless the receiver is capable of processing frames as fast as the transmitter is capable of sending them, it is possible for all of the receive buffers to fill up with received frames. When that happens, if the transmitter sends another frame, the receiver will not have a receive buffer available and the frame may be lost.

The flow control mechanism of the Fibre Channel architecture prevents this type of error condition by allowing the receiver to control when the transmitter may send frames. This flow control mechanism is referred to as buffer to buffer credit. Credits are the number of frames a buffer can hold per fabric port. The number of credits may be different for each port, and even for virtual channels of each port. The number of available credits for each port is generally exchanged during the login process between two ports. When a Fibre Channel HBA (host bus adapter) is connected to a Fibre Channel switch, buffer to buffer credits (BB credits) are exchanged between the HBA and the switch port during login using FLOGI and FLOGI Response. In the FLOGI and FLOGI_RSP payloads, the Common Service Parameters contains a field for BB credit which indicates the number of buffers available for the port.

Buffer to buffer credit control flow works by a sending port using its available credit supply and waiting to have the credits replenished by the port on the opposite end of the link. The credit value is decremented when a frame is sent and replenished when a response is received. If the available credits for a given port reaches zero, the supply of credits is said to be exhausted. Further transmission of frames with that port is then suspended until the amount of credits can be replenished to a non-zero value. The rate of frame transmission is generally regulated by the receiving port in part based on the availability of buffers to hold received frames.

This buffer to buffer credit mechanism works effectively when credits are sent and received correctly. However, BB credits are sometimes lost during their transmission. BB credits may become lost, for example, when the credit is corrupted in transit, when a bad optical link causes errors in SOF (Start Of Frame) resulting in the remote port not seeing the frame and not returning the credit, or when a misbehaving remote port does not respond to the frames being sent by the local port. The depletion in number of BB Credits that were initially exchanged between the two ports during login causes the ports to operate with fewer buffer credits. This results in performance degradation as lost credits negatively impact throughput. Because lost credits are generally not restored until a link reset or link offline event is triggered, performance does not go back to normal until such an event occurs. To prevent this type of performance degradation as a result of lost BB credits, the Fibre Channel Standard provides a mechanism for recovery of lost BB credits.

The credit recovery mechanism of the Fibre Channel standard, specifically in FC-FS3, section 19.4.9, though very useful in restoring the performance of the system, is not efficient and can be improved upon. As Fibre Channel systems become more complex and operate in higher bandwidth environments, credit recovery and proper credit allocation become more essential for overall system performance. Therefore, what is required is a process and system that efficiently and effectively detects and recovers lost credit.

Summary

In one embodiment, a buffer to buffer credit recovery mechanism is disclosed. Buffer to buffer credit recovery involves exchanging primitive control signals and parameters during the login sequence to enable credit recovery. Once credit is lost; there may be a need for resetting a link to reset the credit recovery counters and BB credits. Both of these processes require synchronization between the ports involved in the credit recovery mechanism. This synchronization is achieved by enabling credit recovery during the Link Reset protocol negotiation and ensuring that no frames or R_RDYs are exchanged during the procedure.

BRIEF DESCRIPTIONS OF THE DRAWINGS

DETAILED DESCRIPTIONS

Figure 1:
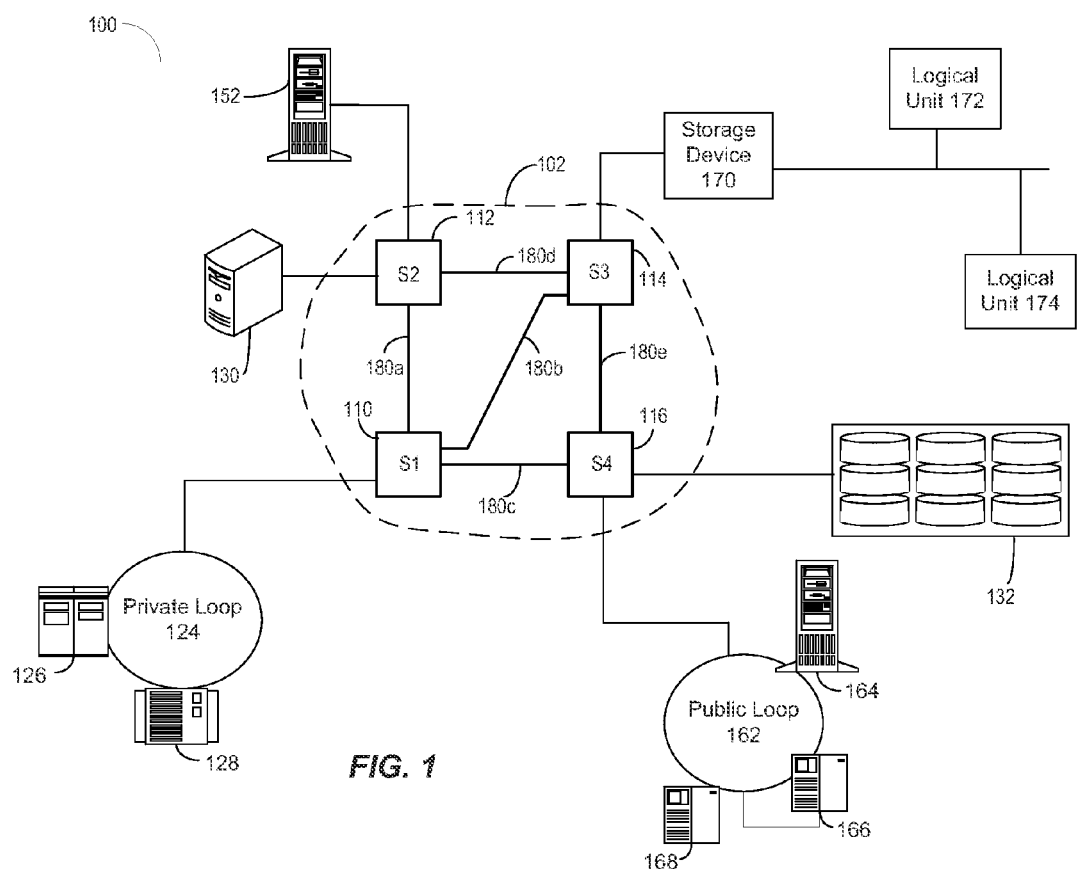
FIG. 1 illustrates a Fibre Channel network communication system according to an embodiment of the present invention.

FIG. 1 illustrates a Fibre Channel network 100 including various network, storage, and user devices. It is understood that Fibre Channel is only used as an example and the invention is applicable to other network architectures, as long as they use a credit based flow control mechanism. Furthermore, the network 100 can represent a "cloud" providing on-demand network access to a shared pool of configurable computing resources (e.g., networks, servers, storage, applications, and services). The network can also represent a converged network such as Fibre Channel over Ethernet. Generally, in the preferred embodiment the network 100 is connected using Fibre Channel connections. In the embodiment shown and for illustrative purposes, the network 100 includes a fabric 102 comprised of four different switches S1 110, S2 112, S3 114, and S4 116. It will be understood by one of skill in the art that a Fibre Channel fabric may be comprised of one or more switches.

A variety of devices can be connected to the fabric 102. On the fabric side, devices are coupled to the fabric via fabric ports. A fabric port (F_Port) supports a point-to-point fabric attachment. A fabric loop port (FL_Port) supports a fabric loop attachment. Both F_Ports and FL_Ports may be referred to generically as Fx_Ports. Typically, ports connecting one switch to another switch are referred to as expansion ports (E_Ports). In addition, generic ports may also be employed for fabric attachments.

On the device side, each device coupled to a fabric constitutes a node. Each device includes a node port by which it is coupled to the fabric. A port on a device coupled in a point-to-point topology is a node port (N_Port). A port on a device coupled in a loop topology is a node loop port (NL_Port). Both N_Ports and NL_Ports may be referred to generically as Nx_Ports. The label N_Port or NL_Port may be used to identify a device, such as a computer or a peripheral, which is coupled to the fabric.

In the embodiment shown in FIG. 1, fabric 102 includes switches S1 110, S2 112, S3 114, and S4 116 that are interconnected. Switch S1 110 is attached to private loop 124, which is comprised of devices 126 and 128. Switch S2 112 is attached to device 152 and device 130, which may also provide a user interface. Switch S3 114 is attached to device 170, which has two logical units 172, 174 attached to it. Typically, device 170 is a storage device such as a RAID device, which in turn may be logically separated into logical units illustrated as logical units 172 and 174. Alternatively the storage device 170 could be a JBOD or just a bunch of disks device, with each individual disk being a logical unit. Switch S4 116 is attached to public loop 162, which is formed from devices 164, 166 and 168 being communicatively coupled together. Switch S4 116 is also attached to storage device 132, which can be a JBOD. Although not explicitly shown, the network 100 can include one or more zones. A zone indicates a group of source and destination devices allowed to communicate with each other.

Switches S1 110, S2 112, S3 114, and S4 116 are connected with one or more inter-switch links (ISLs). Switch S1 110 can be connected to switches S2 112, S3 114, and S4 116, via ISLs 180a, 180b, and 180c, respectively. Switch S2 112 can be connected to switches S3 114 by ISL 180d. Switch S3 114 can be connected to switch S4 116 via ISL 180e. Note that although only single links between various switches have been shown, links between any two switches can include multiple ISLs. The fabric can use link aggregation or trunking to form single logical links comprising multiple ISLs between two switches. The fabric 102 with multiple switches interconnected with ISLs can provide multiple paths with multiple bandwidths for devices to communicate with each other.

Figure 2:
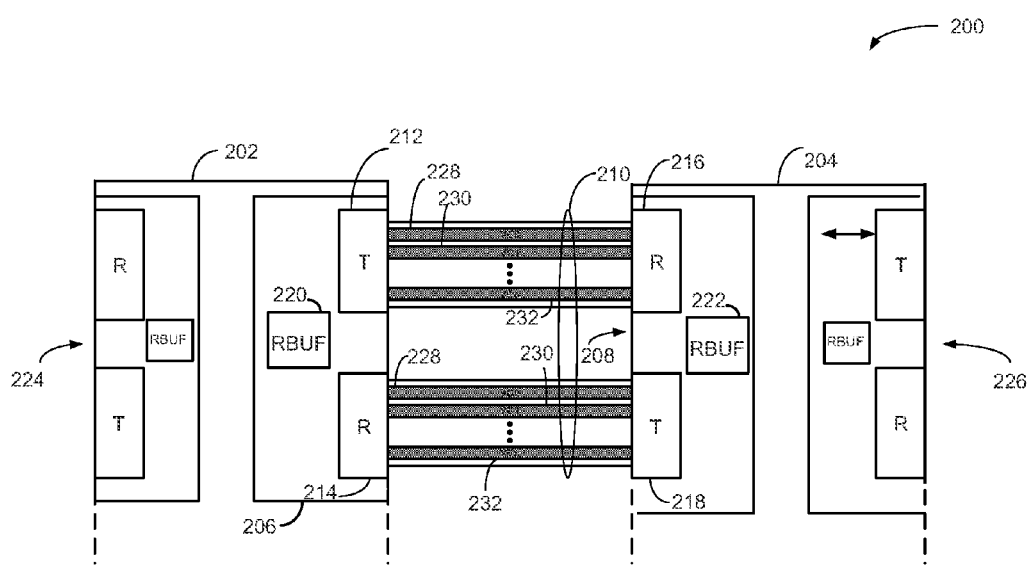
FIG. 2 shows detailed view of two switches interconnected with an inter-switch link according to an embodiment of the present invention.

FIG. 2 illustrates two switches 202 and 204 having ports 206 and 208 connected via an ISL 210. Each port can have a receiver and transmitter. Port 206 includes transmitter 212 and receiver 214. Similarly, port 208 on switch 204 includes transmitter 218 and receiver 216. Each port further includes a receive buffer (RBUF 220 and 222). A receive buffer can receive and hold a frame while it is being processed. Although only one receive buffer is shown for each port, each port generally has more than one receive buffer. Switches 202 and 204 can also include additional ports, such as ports 224 and 226. The broken lines at the bottom of the switches 202 and 204 denote that the switch can include additional ports and processing modules, but that the illustration is focused on the ports 206 and 208.

Ports 206 and 208 can include one or more virtual or logical channels VCo 228-VCn 232, also known as virtual channels in Fibre Channel networks. Each virtual channel is allocated its own queue within the switch. The transmitter 212, for example, determines the virtual channel that an outgoing frame needs to be on. The transmitter 212 can then place the frame in the queue corresponding to that virtual channel. Typically, frames with the same source and destination (denoted by, e.g., S_ID and D_ID) pair are sent and received via the same virtual channel. However, each virtual channel can carry frames having various source destination pairs. In other words, each virtual channel VCo 228-VCn 232 can carry frames associated with different data flows.

Frames associated with a VC are input to the VC's queue for transmission. Several factors dictate when a frame on the head of a VC's queue is eligible for transmission. These factors include the availability of buffer to buffer credits. Credit availability is taken into account in order to prevent flow control errors. If a buffer-to-buffer flow control error occurs and as a result causes overflow, the fabric may discard the overflow frame without notification. To prevent such loss of frames during transmission, the buffer to buffer credit flow control mechanism is employed to pace the flow of frames between a transmitting port and a receiving port. One of the ways in which the buffer to buffer credit mechanism works is by taking into account if a frame is eligible for transmission based on availability of BB credits. Once a frame is determined as eligible for transmission, then an enable signal is used to enable its transmission.

As discussed above, each port has a number of receive buffers for receiving frames. The receive buffers correspond to buffer to buffer credits available. If a receive buffer is available to receive a frame, then a BB credit is indicated as available and transmission can move forward. Buffer to buffer credit is represented by the parameter, BB_Credit. Thus, BB_Credit is used to represent the number of receive buffers supported by a port for receiving frames. The value of BB_Credit for each port is mutually conveyed to other ports during fabric login. In one embodiment, this is done through a buffer-to-buffer credit field of the FLOGI Common Service Parameters. The minimum or default value of BB_Credit is one. BB_Credit_CNT is a parameter defined as the number of unacknowledged or outstanding frames awaiting a Fibre Channel Receive-Ready (R_RDY) control word response from a directly attached port. BB_Credit_CNT thus represents the number of receive buffers that are occupied at the attached port. Accordingly, a transmitting FC port uses BB_Credit_CNT to track the number of frames transmitted for which R_RDY responses are outstanding.

In buffer to buffer flow control, each port is responsible for managing its own credit count (BB_Credit_CNT). To avoid possible overrun at the receiver, each port is responsible for maintaining BB_Credit_CNT less than BB_Credit. Thus, a transmitting port cannot transmit a frame unless the allocated BB_Credit for the receiving port is greater than zero and the BB_Credit_CNT is less than this BB_Credit. Each port is also responsible for setting the BB_Credit_CNT value to zero at the end of Login or Relogin in a point-to-point topology, at the end of Login or Relogin to the Fabric in a Fabric topology, or upon recognition of any Primitive Sequence Protocol. Each port increments BB_Credit_CNT by one for each frame transmitted and decrements by one for each R_RDY received. Recognition of SOFx2 or SOFx3 is responded to by a transmission of an R_RDY when the buffer becomes available, regardless of whether the frame is valid, invalid, or discarded.

Figure 3:
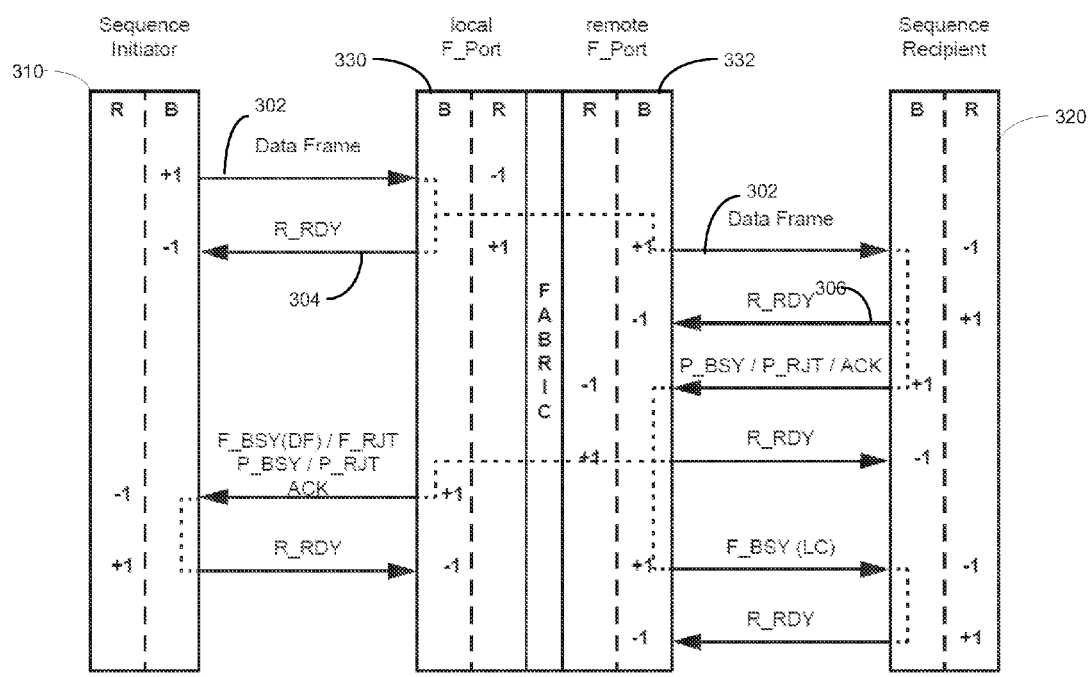
FIG. 3 illustrates a buffer to buffer credit recovery model involving two ports according to an embodiment of the present invention.

An exemplary buffer to buffer flow control model is illustrated in FIG. 3. The sequence initiator 310 is a port that initiates transmission of a frame or sequence. The sequent recipient 320 indicates a port that receives the transmitted sequence or frame. The B column for each port shows changes in BB_Credit_CNT. The R column for each port shows changes in buffers available for receiving frames. As shown, each port includes buffers for receiving frames.

The sequence initiator 310 sends a data frame 302 intended for the sequence recipient 320 through local F_Ports 330 and 332. R_RDY 304 is sent as a response to the data frame 302. FIG. 3 illustrates all possible responses to the data frame. Solid lines with arrow heads denote frame flow. Dotted lines indicate frame originations resulting from frame reception. When a data frame is received at the port 330, the R column shows a negative one (−1) to indicate that the port now has one less buffer available for receiving frames. When that data frame is transmitted from port 330 onto the next port 332 and an R_RDY is sent back to the sequence initiator 310, port 330's R column illustrates a plus one (+1) to indicate one buffer was added to its available receive buffers. The same thing occurs for the sequence recipient 320 when it receives the data frame 302 and then sends the R_RDY 306 back. The sequence recipient 320 may send a Nx_Port_Busy response (P_BSY), P_RJT (Nx_Port Reject) or acknowledge link response frame (P_BSY/P_RJT/ACK signal) back to the remote F_Port 332, in which case, sequence recipient 320's B column illustrates a plus one (+1) to indicate one BB_Credit_CNT was added to its' BB credit count. The local F_Port can transmit a F_BSY(DF) (Fabric Busy response for Data frame), F_RJT(Fabric Reject), P_BSY, or P_RJT(Nx_Port Reject) acknowledgment link response back to the sequence initiator 310. As shown in FIG. 3, all of these various responses to the data frame comply with the buffer to buffer flow control model.

According to the the Fibre Channel Standard, an FC port that supports BB credit recovery generally maintains three BB credit recovery counters, a BB_SC_N, a BB_RDY_N, and a BB_FRM_N. BB_SC_N is the log 2 of BB_Credit Recovery modulus. BB_RDY_N counts the number of R_RDY primitives received, and BB_FRM_N counts the number of frames received.

Fibre Channel BB credit recovery also defines two primitive signals, BB_SCr and BB_SCs. The mechanism involves periodically exchanging the two primitives, BB_SCr and BB_SCs, after a specific number of frames or R_RDYs are sent. The specific number is exchanged as part of the login process in the BB_SC_N field. The BB_SCs primitive signal is sent to indicate that a predetermined number ($2^{BB\_SC\_N}$) of frames were sent since the previous BB_SCs was sent. The BB_SCr primitive signal is sent to indicate that a predetermined number ($2^{BB\_SC\_N}$) of R_RDY primitive signals were sent since the previous BB_SCr was sent.

Generally, BB credit recovery is performed when two ports have logged in with each other and have agreed to a non-zero BB_SC_N value. During transmission of frames, BB credit recovery uses the BB_SCs primitive and the BB_SCr primitive to account for exchange of frames and R_RDY primitives. Generally, two credit recovery operations are used, one for lost frames and another for lost R_RDYs. For lost frames credit recovery, BB_SCs is transmitted whenever $2^{BB\_SC\_N}$ frames have been transmitted since the last BB_SC was transmitted. The receiving port counts the number of frames received between received BB_SCs primitive signals and if the number is less than $2^{BB\_SC\_N}$, the receiving port transmits as many R_RDYs as frames were lost back to the originating port. Thus, the originating port does not lose credit for transmitting more frames.

For lost R_RDY(s) credit recovery, BB_SCr is transmitted whenever $2^{BB\_SC\_N}$ R_RDYs have been transmitted since the last BB_SCr was transmitted. The receiving port counts the number of R_RDYs received between received BB_SCr primitive signals and if the number is less than $2^{BB\_SC\_N}$, it adds the lost number of credits to its credit counter. Thus, a receiver does not lose credit for transmitting more frames.

Flowcharts of FIGS. 4A-4D illustrate the steps performed by a port in recovering a lost BB credit. At step 402, a port receives a R_RDY. After receiving each R_RDY, the receiving port increments BB_RDY_N by one, at step 404. Then, at step 406, the port determines if BB_RDY_N equals $2^{BB\_SC\_N}$, which signals that $2^{BB\_SC\_N}$ number of R_RDY primitives have been sent since the completion of Login, Link Reset, or since the last time a BB_SCr primitive was sent. If BB_RDY_N equals $2^{BB\_SC\_N}$, then the port sets BB_RDY_N to zero at step 408. When a BB_SCr primitive is received at step 410, BB_credits lost is calculated, at step 412, using the following equation:

$$BB\_Credits\ lost = (2^{BB\_SC\_N} - BB\_RDY\_N)\ modulo\ 2^{BB\_SC\_N}.$$

After calculating the number of BB_Credits lost, the algorithm determines whether or not credits are lost at step 414. If credits are lost, the BB_Credit_CNT is then decremented by the number of BB_Credits lost, at step 416 and the port sets BB_RDY_N to zero (0), at step 418, before the next R_RDY is received. If the number of BB_Credits lost is equal to zero, then the algorithm recognizes that no credits were lost, at step 420.

Figure 4A:
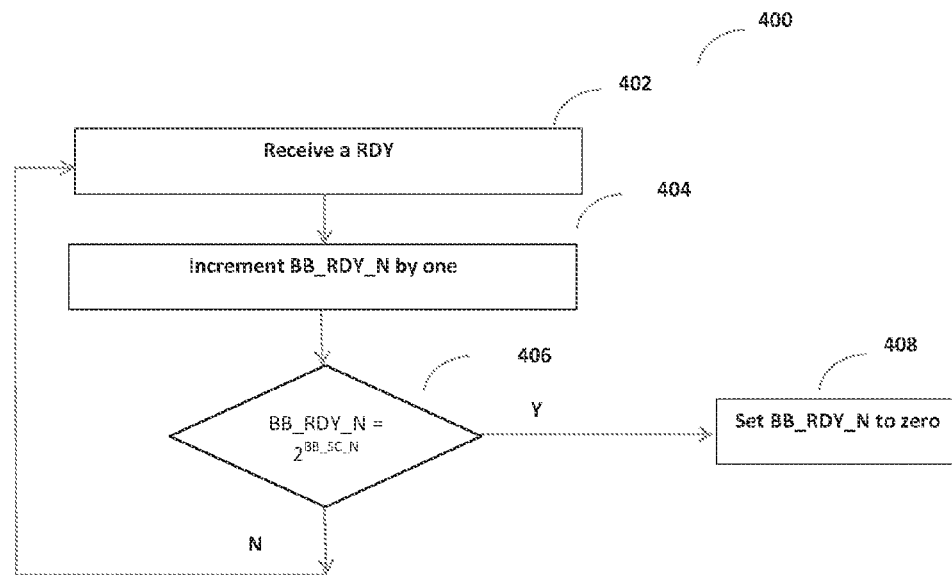
FIGS. 4A-4D illustrate flowcharts describing exemplary operations for recovering lost buffer to buffer credits.
Figure 4B:
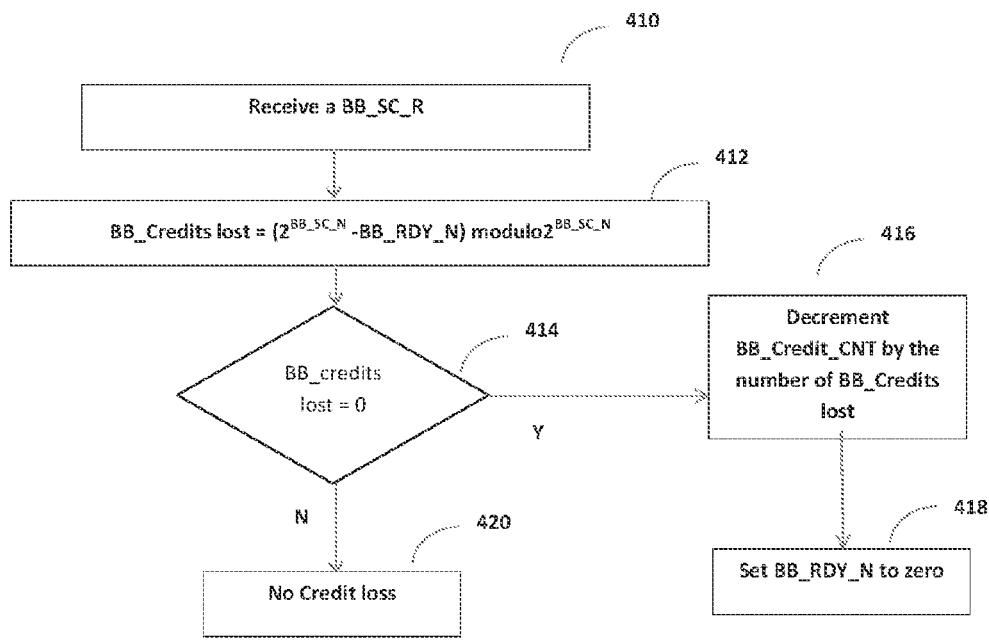
Figure 4C:
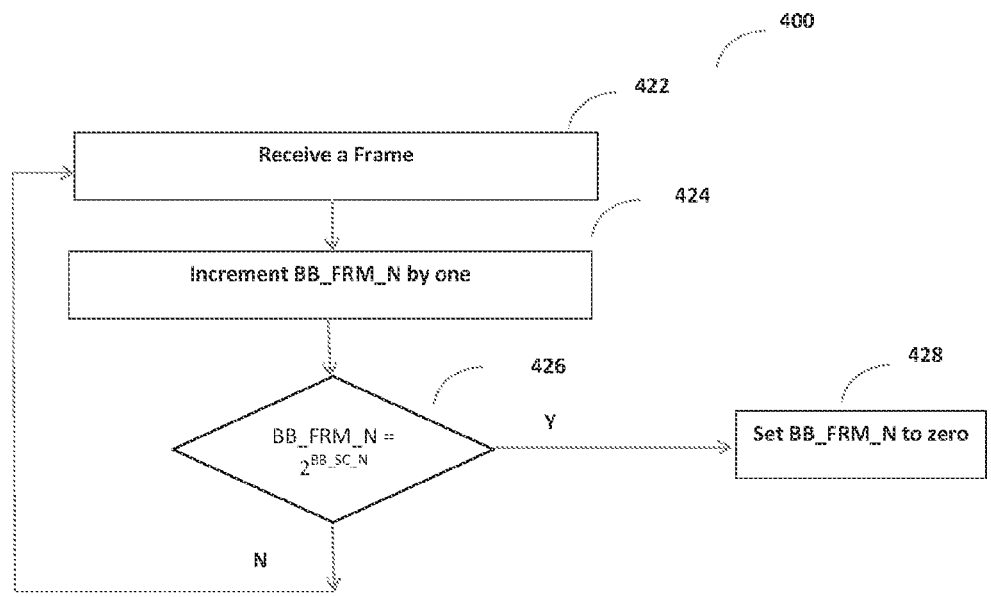
Figure 4D:
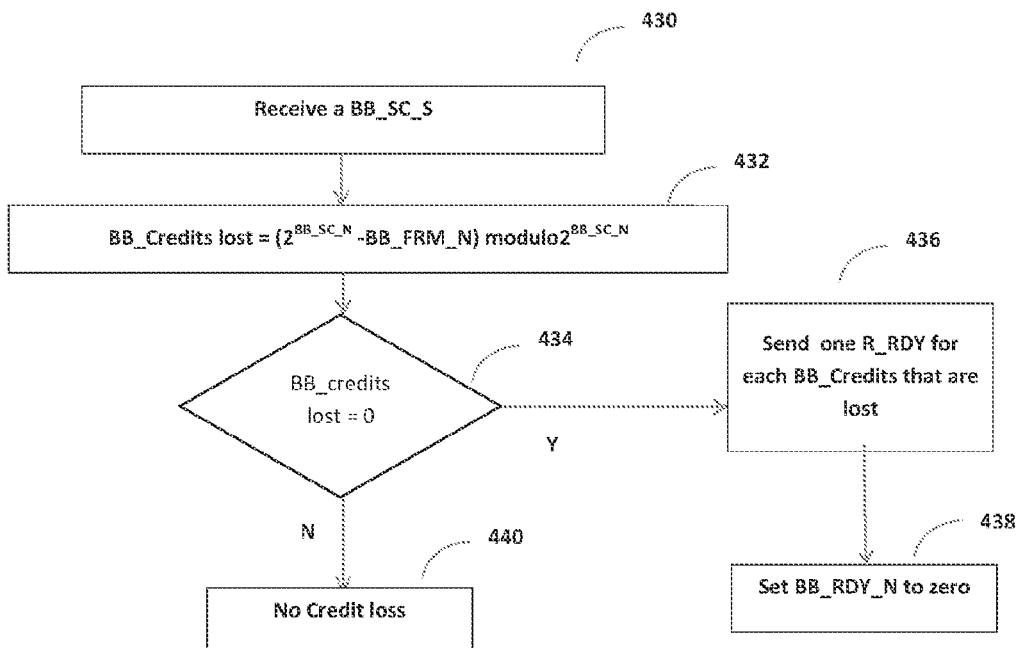

FIG. 4C illustrates the steps performed when a frame is received. After receiving a frame at step 422, the receiving port increments BB_FRM_N by one, at step 424. Then, at step 426, it determines if BB_FRM_N equals $2^{BB\_SC\_N}$, indicating that $2^{BB\_SC\_N}$ numbers of frames that require BB_Credit have been received since the completion of Login, Link Reset, or since the last time a BB_SCs primitive was recieved. If BB_FRM_N equals $2^{BB\_SC\_N}$, then the port sets BB_FRM_N to zero, at step 428. When a BB_SCs primitive is received, at step 430, the number of BB credits the other port has lost may be calculated, at step 432, using the following equation:

$$BB\_Credits = (2^{BB\_SC\_N} - BB\_FRM\_N)\ modulo\ 2^{BB\_SC\_N}.$$

After calculating the number of BB_Credits lost by the other port, the algorithm determines, at step 434, whether or not any BB_Credits are lost. If BB_Credits are lost, then at step 436, one R_RDY is resent for each BB credit that is lost. The port then sets BB_RDY_N to zero, at step 438, before the next frame is received. If the number of BB_Credits lost is equal to zero, then the algorithm recognizes that no credits were lost, at step 440.

Figure 5:
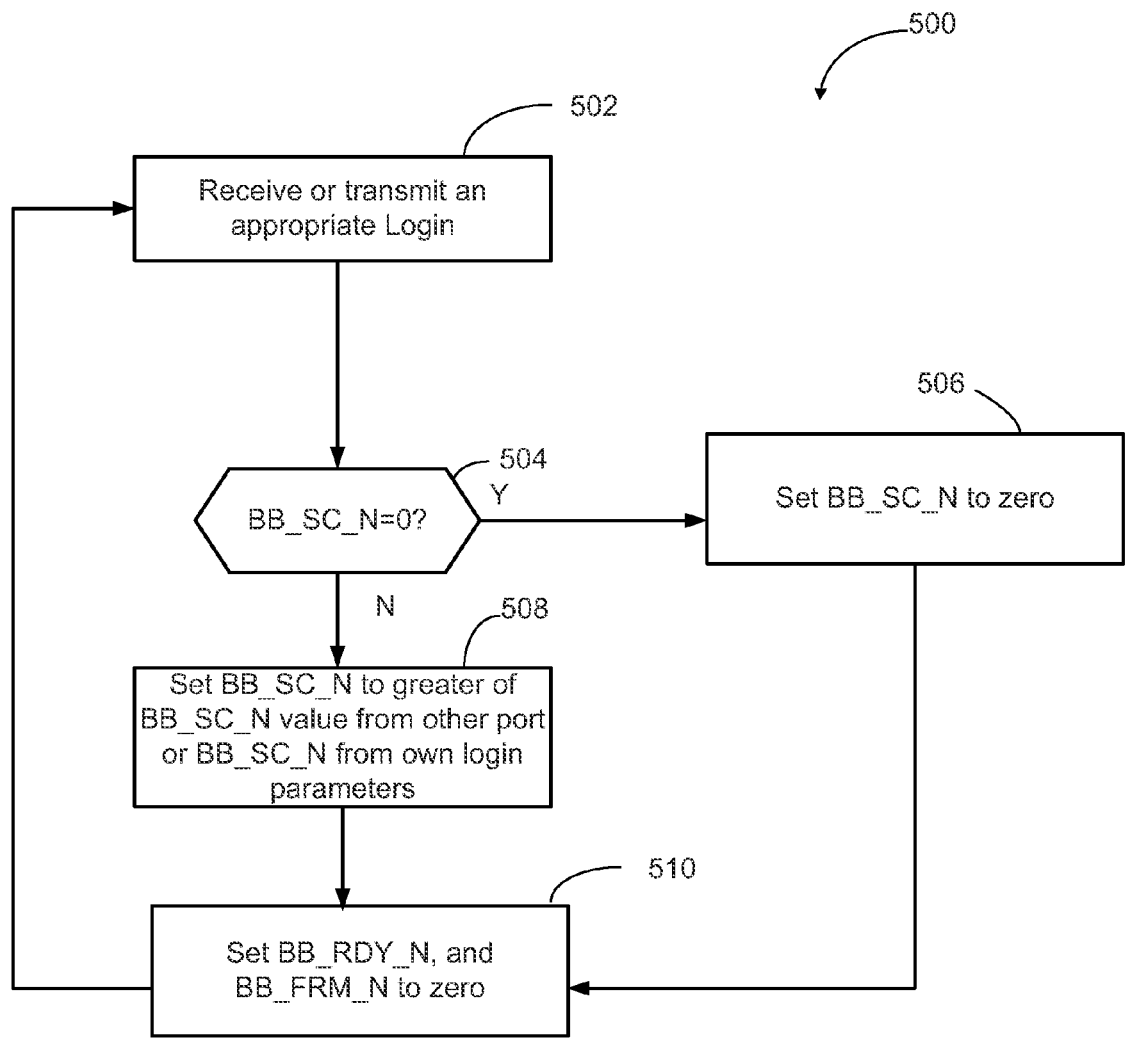
FIG. 5 illustrates a flowchart describing exemplary operations for enabling buffer to buffer credit recovery during a Login sequence.

In order for this credit recovery mechanism to function properly, it is important that the system performs specific actions to enable credit recovery. Flowchart 500 of FIG. 5 illustrates the steps taken in prior art systems in completing an appropriate login for enabling the system to perform a BB credit recovery. In FIG. 5, starting at step 502, the system transmits or receives an appropriate Login. An appropriate login could be a first Login after reset or a Relogin. Then at step 504, the port determines if the BB_SC_N value communicated by the other port in the Login is zero. If yes, then the port sets it's own BB_SC_N to zero, at step 506 and goes to step 510. If the BB_SC_N value communicated by the other port is not zero, then at step 508, the port sets it's BB_SC_N to the greater of the BB_SC_N value from the other port's Login parameters or BB_SC_N value from its own Login parameters, and at step 510, sets BB_RDY_N and BB_FRM_N to zero. In this manner, BB credit parameters are set at the end of the login sequence and the system is ready to perform credit recovery.

After an appropriate login has been completed, during credit recovery, a port sets BB_SC_N to the login value and BB_RDY_N and BB_FRM_N to zero upon recognition of a Link Reset Protocol, and set BB_SC_N, BB_RDY_N, and BB_FRM_N to zero upon recognition of a Link Initialization. BB_SC_N, BB_RDY_N, and BB_FRM_N are also set to zero after explicit or implicit logout.

The inventors of the present invention have discovered that the above described process of enabling credit recovery results in various failure modes. The inventors have determined that the failure modes can occur for example, if frames are exchanged between the two ports while BB credit parameters are being exchanged. To avoid such failure modes and ensure an accurate credit recovery, the preferred embodiment of the present invention prevents frames are from being exchanged between the two ports involved in the credit recovery process while credit recovery is being enabled. This requires that the two ports be synchronized. Such a synchronization is not provided by a normal login sequence.

The inventors have also discovered that during credit recovery, if a Link Reset is issued by either of the ports, for example, due to a fault on the link or one of the ports, the credit recovery parameters and BB credits need to be reset. This also requires synchronization between the two ports involved in the credit recovery.

To resolve these issues, the preferred embodiment of the present invention, achieves synchronization between the two ports by enabling credit recovery within the Link Reset protocol negotiation. In this mechanism, once BB_SC_N and BB credits are exchanged between the two ports, during the login sequence, Link Reset is issued to allow both ports to become in sync and to program the BB_SCN and BB credits. One embodiment of this method is illustrated in FIG. 6.

Figure 6:
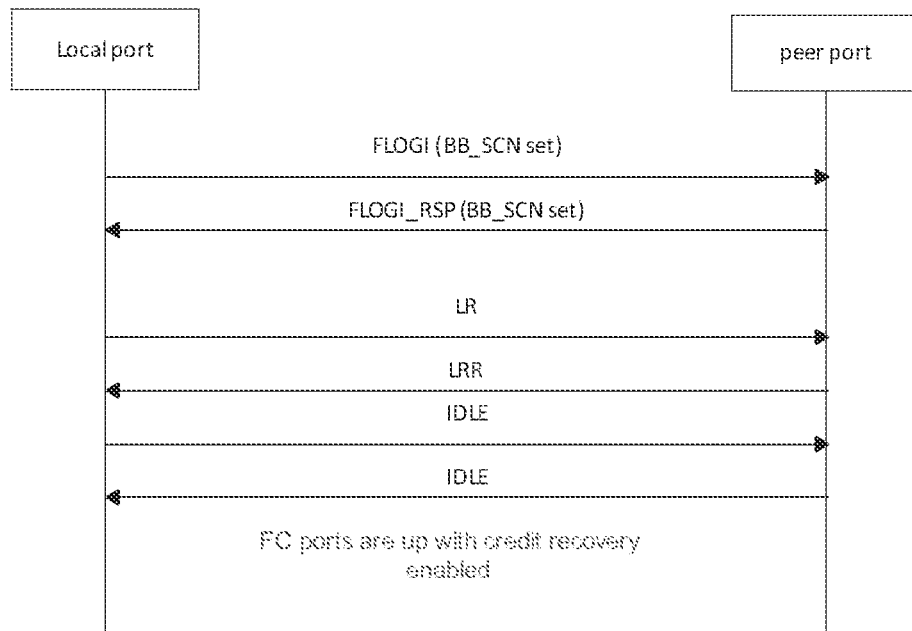
FIG. 6 illustrates a protocol negotiation between two ports for enabling buffer to buffer credit recovery according to an embodiment of the present invention.

As shown in FIG. 6, upon a Fibre Channel linkup between two ports, the local port sends a FLOGI to the remote port specifying a BB_SC_N value and a BB_credits value, both of which are embedded in the FLOGI. The remote port then responds back with a FLOGI Response with its own configured BB_SC_N value and BB Credits value. If credit recovery is supported on both ends, then the port that issued the FLOGI, initiates a Link Reset protocol. After a successful Link Reset protocol, both ports are up with BB credit recovery enabled.

Figure 7:
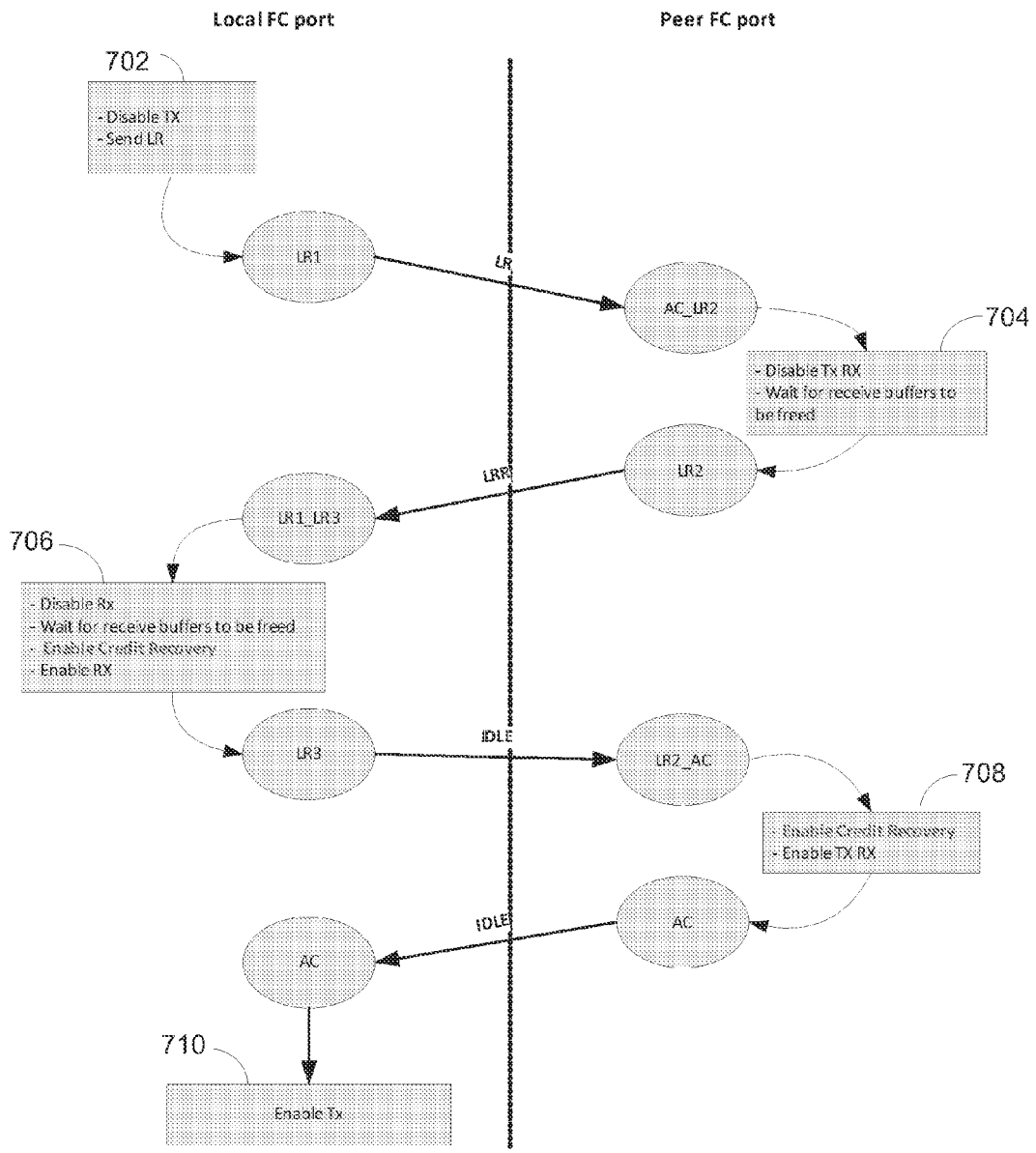
FIG. 7 illustrates a diagram of the various states of the two ports involved in enabling buffer to buffer credit recovery according to an embodiment of the present invention.

FIG. 7 illustrates the different states of Link Reset protocol and the operations done at each state to ensure that no frames are exchanged while credit recovery is being enabled. As illustrated, at step 702, the local port disables transmission and issues a Link Reset, placing the local port in an LR1 state. The remote peer port then transitions from an active state to LR2, at step 704, by disabling receive and transmission capabilities, while it waits for receive buffers to be freed, and then transmits a LRR (Link Reset Response) signal. The local port then transitions from the LR1 state to LR3, in step 706, by disabling receiving capabilities and waiting for receive buffers to be freed. Once the receive buffers have been freed for the local port, it enables credit recovery. After credit recovery has been enabled, then the local port enables its receiving capabilities, and transmits an IDLE to the remote port to indicate its completion of step 706. The remote peer port then transitions from LR2 to active again, in step 708, by first enabling credit recovery and then enabling its receiving and transmitting capabilities. After the remote peer port has transitioned back to active and thus transmitting an IDLE to the local port to indicate its completion of step 708 then the local port also transitions to active and subsequently enables its transmission capabilities in step 710.

This step by step process ensures that no frames are transmitted or lost during the enabling of credit recovery. By transitioning from active to LR1, the local port ensures that it will not be sending any frames or R_RDYs during this process. At this stage, the local port does not disable its receiving capabilities, because the remote port is still able to send frames and/or R_RDYs. After recognizing that the local port has moved to an LR1 state, then the remote peer port stops sending and receiving frames. It can safely do so at this stage because the local port has already disabled its' transmission of frames. Once the local port recognizes that the remote port has moved to an LR2 state, it can also disable its receiving capabilities. This is the state where neither port can send or receive frames and/or R_RDYs. This is the best stage for enabling credit recovery and exchanging the credit recovery parameters. Once that has been done, the ports can transition back to active and continue their operations normally. This method provides an efficient and seamless manner for enabling credit recovery and greatly improves the flow control mechanisms of the Fibre Channel standard.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for enabling buffer to buffer credit recovery comprising:
    exchanging buffer to buffer credit recovery parameters by a local port and a remote port;
    ensuring that both the local port and the remote ports are not exchanging frames;
    enabling buffer to buffer credit recovery for both the local port and the remote ports; and
    allowing normal operations to proceed;
    wherein ensuring that both the local port and the remote port are not transmitting frames comprises:
        disabling a transmission capability of the local port;
        sending an indication to the remote port that the local port's transmission capability has been disabled;
        disabling transmission and receiving capabilities of the remote port;
        sending an indication to the local port that the remote port's transmission and receiving capabilities have been disabled; and
        disabling the local port's receiving capabilities.

2. The method of claim 1, wherein the buffer to buffer credit recovery parameters are contained in a Login sequence exchanged by the ports.

3. The method of claim 1, further comprising issuing a Link Reset protocol by one of the ports.

4. The method of claim 1, further comprising issuing a Link Reset by the local port, after disabling the transmission capability of the first port.

5. The method of claim 1, further comprising issuing a Link Reset Response by the remote port, after disabling the transmission and receiving capabilities of the remote port.

6. The method of claim 1, further comprising issuing an IDLE by each of the ports, after enabling buffer to buffer credit recovery.

7. The method of claim 1, wherein allowing normal operations to proceed comprises enabling the transmission and receiving capabilities of the first port and the remote port.

8. A method for enabling buffer to buffer credit recovery comprising:
   providing buffer to buffer credit parameters of a local port;
   receiving buffer to buffer credit parameters of a remote port;
   ensuring the first port is not transmitting frames;
   receiving an indication from the remote port that the remote port is not transmitting or receiving frames;
   enabling buffer to buffer credit recovery for the local port; and
   allowing normal operations to proceed, after an indication has been received from the remote port that buffer to buffer credit recovery has been enabled for the remote port.

9. The method of claim 8, wherein the buffer to buffer credit recovery parameters of the local port and the buffer to buffer credit parameters of the remote port are contained in a Login sequence.

10. The method of claim 8, further comprising issuing a Link Reset protocol.

11. The method of claim 8, wherein ensuring that the first port is not transmitting frames comprises:
   disabling a transmission capability of the local port;
   providing an indication that the first port's transmission capability has been disabled;
   receiving an indication that transmission and receiving capabilities of the remote port have been disabled; and
   disabling the first port's receiving capabilities.

12. The method of claim 11, further comprising issuing a Link Reset by the first port, after disabling the transmission capability of the first port.

13. The method of claim 11, further comprising receiving a Link Reset Response from the remote port.

14. The method of claim 11, further comprising issuing an IDLE by the first port, after enabling buffer to buffer credit recovery.

15. The method of claim 11, wherein allowing normal operations to proceed comprises enabling the transmission and receiving capabilities of the first port.

16. A network device comprising:
   a local port including one or more receive buffers; the local port configured to send its number of receive buffers to a remote port and to receive from the remote port its number of receive buffers;
   the local port further configured to stop exchanging frames with the remote port after it has exchanged its number of receive buffers with the remote port, to enable buffer to buffer credit recovery after stopping exchanging frames with the remote port; and to allow normal operations to proceed, after receiving an indication from the remote port that buffer to buffer credit recovery has been enabled for the remote port.

17. The device of claim 16, wherein the number of receive buffers is one of two or more buffer to buffer credit parameters that are exchanged between the local port and the remote port.

18. The device of claim 17, wherein the number of receive buffers from the local port and the number of receive buffers from the remote port buffer to buffer credit recovery parameters are contained in a Login sequence.

19. The device of claim 16, wherein the local port is further configured to issue a Link Reset protocol.

20. The device of claim 16, wherein the local port is further configured to receive a Link Reset Response from the remote port.

21. The device of claim 16, wherein the local port is further configured to issue an IDLE, after enabling buffer to buffer credit recovery.

22. The device of claim 16, wherein the local port is configured to allow normal operations to proceed by enabling exchange of frames with the remote port.

* * * * *